UNITED STATES PATENT OFFICE 2,250,553

MEDICINAL PREPARATION

Simon L. Ruskin, New York, N. Y.

No Drawing. Application April 18, 1938,
Serial No. 202,676

15 Claims. (Cl. 167—68)

The present invention relates to the production of improved therapeutic preparations and more particularly to the production of therapeutic metal compounds of glutathione and its derivatives.

The present application is a continuation-in-part of my copending application Serial No. 659,904, filed March 6, 1933.

Glutathione is a tripeptide which on hydrolysis is decomposed into glutamic acid, cysteine and glycine. The accepted formula for glutathione is the following:

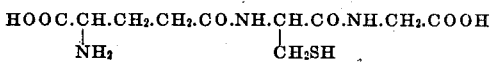

This compound is known to be one of the most powerful physiological reducing agents.

It is the general object of the invention to produce metal compounds of glutathione and of the derivatives of glutathione which are suitable for the treatment of syphilis, staphylococcus infections, psoriasis, furunculosis, acne, and other coccus and skin diseases.

More specifically it is an object of the invention to provide a metal salt of glutathione which is capable of counteracting the toxic action of arsenicals employed in the treatment of such diseases as syphilis and at the same time permit the continuation of the antisyphilitic treatment with bismuth.

It is a further object of the invention to provide a water-soluble compound of bismuth which is readily tolerated by the tissues on injection and which is itself less toxic than other bismuth preparations currently employed.

It is also an object of the invention to provide compounds of antimony, arsenic, manganese and of other metals which can safely be injected into the human organism without untoward effects, and which are active in the control and cure of the diseases above enumerated.

I have found that, in particular, bismuth glutathione represents a highly desirable form of bismuth for use in the treatment of such diseases as syphilis in patients who are sensitive to heavy metal and arsenical poisoning. The basic character of glutathione makes it possible to adjust the pH of bismuth glutathione and also of other metal compounds of glutathione to an H-ion concentration that is closer to neutrality than is ordinarily obtainable with other compounds of these metals.

The method of production of glutathione is known. The production of this compound from yeast is described by E. C. Kendall, B. F. Mackenzie, and H. L. Mason in the Journal of Biological Chemistry, vol. 84, pages 657 ff. (1929). This method consists principally in the following operations: Yeast is boiled for 4-5 minutes in water which is acidified with a little acetic acid, and then filtered. The clear solution is treated with a saturated solution of lead acetate and thereafter with a solution of mercuric sulfate. The precipitate formed is removed from the mother liquor and after washing is suspended in water. After decomposition with hydrogen sulfide, the lead and mercuric sulfides are filtered off and the excess of hydrogen sulfide is removed by blowing air and finally hydrogen through the filtrate. The solution of glutathione is acidified with sulfuric acid and an aqueous suspension of cuprous oxide is added, an excess of the latter being avoided. The precipitate is centrifuged and the resulting cuprous salt of glutathione is decomposed with hydrogen sulfide and, after filtration, the filtrate is freed from hydrogen sulfide by blowing through with hydrogen. The obtained clear solution is concentrated in vacuo, and the residue is mixed with alcohol and, on standing in a desiccator over sulfuric acid, yields crystals of glutathione. Its melting point is approximately 190°. It is easily soluble in water, but insoluble in organic solvents.

The metal compounds of glutathione may be prepared by simple neutralization or by double decomposition. Thus, in the latter method, a metal salt, such as manganous chloride ($MnCl_2$) is reacted with sodium glutathionate in approximately equivalent proportions. The resulting sodium chloride may be separated, at least in part, from the manganese glutathione, as by fractional crystallization, but ordinarily the presence of the sodium chloride is not objectionable, particularly as it is generally desirable to administer the metal salt of glutathione in the form of an isotonic solution.

The metal compounds of glutathione can be prepared also by reacting basic compounds of the metals with free glutathione, which is a dicarboxylic acid, the metal glutathionates being formed by neutralization as will be readily understood.

In preparing the metal glutathionates, it is desirable to exclude air and oxygen, as by working in a carbon dioxide, nitrogen or hydrogen atmosphere, or in a vacuum. The water as well as the chemicals employed are preferably carefully freed from absorbed or occluded oxygen prior to the reaction.

The glutathione is preferably employed in the reduced condition. Instead of glutathione the derivatives thereof, such as the mono-esters, and in general the alkyl, aryl and aralkyl substitution products, may be employed.

The invention will be illustrated in greater detail with the aid of the following examples which are presented purely by way of illustration:

EXAMPLE 1

*Preparation of bismuth glutathionate*

1 gram (1/300 mol) of glutathione is dissolved in 25 cc. of 33% glycerol and is treated under stirring with 5 cc. of a 33% glycerol solution containing 1.6 grams of $Bi(NO_3)_3.5H_2O$ (1/300 mol). After the last portion of the bismuth nitrate has been added, the yellow solution is stirred for about 10 minutes and the acidity is slowly brought to a point just short of neutrality with about 9 cc. of NaOH. The yellow precipitate is centrifuged and washed three times with distilled water by centrifugation. The moist precipitate is suspended in 60 cc. of a 50% glycerol solution and treated under stirring and slowly with just enough N NaOH to dissolve the bismuth salt. This should require about 4 cc. (theory 3.3 cc.). The solution now has a pH above 9.6. It is brought to a pH of about 8 by the addition of .25-.50 gram of glutathione. The solution is then stabilized by the addition of 1 cc. of 10% $Na_2SO_3$ and made up to 90 cc. with distilled water.

The solution so prepared has been found by me to be effective in the treatment of syphilis, particularly in those patients who are peculiarly susceptible to arsenic and other metal poisonings. The dosage is regulated according to the quantity of bismuth and may amount to 20 mg. of Bi per dose which is given twice a week in the form of 1 or 2 cc. of solution. The injections are made intramuscularly.

In a similar way the corresponding compounds of antimony and arsenic may be prepared. I have, however, found that bismuth glutathionate in general represents a more desirable therapeutic agent than the antimony and arsenic compounds in the treatment of syphilis.

EXAMPLE 2

*Preparation of manganese glutathione*

A quantity of glutathione is first neutralized with the equivalent proportion of sodium or potassium hydroxide. The alkali metal glutathionate is then reacted with an equivalent amount of $MnCl_2$ in aqueous solution, the process being conducted, as above indicated, in a non-oxidizing atmosphere. The resulting mixture may be crystallized to effect an at least partial separation of the manganese glutathionate from the alkali metal chloride, but especially in the case of sodium chloride, such separation is not essential. A stabilizer in the form of sodium or potassium citrate may be added in small amount to the manganous solution. The dosage may amount to 1 or 2 grains of the metal injected intramuscularly twice a week. This solution is effective for the treatment of toxic conditions, especially in staphylococcus infections of various kinds and also in psoriasis, furunculosis, acne and other skin affections.

In similar fashion the glutathionates of copper, iron, silver, mercury, the alkaline earth metals, such as calcium, may be prepared, the "ous" compounds of the metals being preferably employed where the metal has more than one valence. The metal compounds are injected intramuscularly, preferably in the form of isotonic solutions, and can be employed in general for the treatment of those diseases for which the individual metals are known to be specific and in the dosages commonly employed, as the glutathione radical is non-poisonous. Thus iron glutathionate is indicated for the treatment of anaemia, particularly as it combines the properties of both oxidation and reduction, and may be injected intramuscularly every other day in dosages of 1 to 2 grains; while the mercury compound is suitable for the treatment of syphilis and other diseases and may be employed in dosages similar to bismuth. The silver compound may be applied in the form of a 1 to 2% solution in situations where silver compounds have heretofore been employed, as for topical application on mucous membranes in inflammations of the nose and throat and for the treatment of gonorrhea (urethra and eyes); for intramuscular injection in the treatment of septicemia, the dose may be ¼ to ½ grain of the salt. The calcium compound is indicated for the treatment of faulty calcium metabolism and dosages as high as 3 cc. of a 15% solution may safely be injected. The glutathione radical, I have found, serves as an excellent vehicle for the introduction of therapeutic metals into the animal organism, for it greatly reduces or eliminates the irritation accompanying the use of other compounds of the same metals.

The glutathionates prepared in accordance with the invention are preferably employed in isotonic solution and should be packaged under such conditions that oxidative influences are eliminated. The salts may be prepared for the market in the form of solutions in ampoules, but they may also be packaged in the dry condition.

I claim:

1. A therapeutic preparation comprising an isotonic solution of a sodium glutathione compound of an element of group Vb of the periodic system.

2. The soluble, alkali metal salt of bismuth glutathione.

3. A therapeutic preparation containing a solubilized manganese glutathione.

4. A therapeutic preparation comprising a solution of a sodium salt of a bismuth compound of a member of the group consisting of glutathione, its mono-esters and alkyl, aryl and aralkyl substitution products.

5. A therapeutic preparation comprising a solution of a manganese compound of a member of the group consisting of glutathione, its mono-esters and alkyl, aryl and aralkyl substitution products.

6. A therapeutic preparation for administration into the animal organism comprising a suspension of sodium bismuth glutathione in a liquid polyhydric alcohol.

7. A therapeutic preparation for administration into the animal organism comprising an aqueous glycerol solution of sodium bismuth glutathionate together with a stabilizing agent of reducing nature.

8. The method of preparing a solution of bismuth glutathione which comprises reacting approximately equimolecular proportions of glutathione and a soluble salt of bismuth, adding a quantity of an alkali metal base to reduce the acidity of the mixture, separating the bismuth precipitate, and bringing the same into solution with sodium hydroxide.

9. A solution of the sodium salt of bismuth glutathione having a pH of about 8 and containing excess sodium glutathionate over that combined with the bismuth.

10. A stabilized solution of the sodium salt of bismuth glutathione in a concentration suitable for injection, said solution having a pH of about 8.

11. The method of preparing manganese glutathionate which comprises reacting sodium glutathionate with a soluble manganous salt.

12. The method of producing a solution of bismuth glutathione which comprises dissolving glutathione in glycerol, treating the solution with a glycerol solution of bismuth nitrate, adding a base in an amount just sufficient to reduce the acidity to a point just short of neutrality, separating the precipitate, dissolving the same in an alkali metal hydroxide solution and subsequently adding sufficient glutathione to reduce the pH to about 8.

13. The alkali metal salt of a glutathione compound of a member of the group consisting of bismuth, antimony, arsenic, iron, manganese, copper, silver and mercury.

14. The reaction product of sodium glutathionate and a soluble salt of an element of the group consisting of bismuth, antimony, arsenic, iron, manganese, copper, silver and mercury.

15. A therapeutic preparation comprising an alkali metal glutathione compound of iron.

SIMON L. RUSKIN.